(12) United States Patent
Kim

(10) Patent No.: US 8,731,800 B2
(45) Date of Patent: May 20, 2014

(54) APPARATUS AND METHOD FOR CONTROLLING MOTOR

(75) Inventor: Chongwon Kim, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 280 days.

(21) Appl. No.: 13/214,910

(22) Filed: Aug. 22, 2011

(65) Prior Publication Data

US 2012/0143464 A1   Jun. 7, 2012

(30) Foreign Application Priority Data

Dec. 7, 2010  (KR) ........................ 10-2010-0124220

(51) Int. Cl.
*F01L 1/34*  (2006.01)
*F02D 13/02*  (2006.01)

(52) U.S. Cl.
USPC .................... 701/102; 123/90.11; 123/90.15; 123/345; 123/346

(58) Field of Classification Search
USPC ......... 701/102; 123/90.11, 90.15–90.18, 345, 123/346
See application file for complete search history.

(56) References Cited

U.S. PATENT DOCUMENTS

| 6,659,055 | B2 | 12/2003 | Park | |
|---|---|---|---|---|
| 7,308,871 | B2* | 12/2007 | Machida | 123/90.15 |
| 7,484,497 | B2* | 2/2009 | Watanabe et al. | 123/345 |
| 8,355,235 | B2* | 1/2013 | Machida et al. | 361/160 |
| 2008/0081702 | A1* | 4/2008 | Tanaka et al. | 464/1 |
| 2009/0088955 | A1* | 4/2009 | Okamoto | 701/105 |
| 2009/0151675 | A1* | 6/2009 | Oh | 123/90.16 |
| 2009/0288621 | A1* | 11/2009 | Mikawa et al. | 123/90.15 |
| 2010/0059005 | A1* | 3/2010 | Stone et al. | 123/90.16 |
| 2010/0122677 | A1* | 5/2010 | Lee et al. | 123/90.16 |
| 2010/0139588 | A1* | 6/2010 | Kim et al. | 123/90.16 |

FOREIGN PATENT DOCUMENTS

| JP | 2003-120347 A | 4/2003 |
|---|---|---|
| JP | 2005-090241 A | 4/2005 |
| JP | 2006-183603 A | 7/2006 |
| JP | 2008-57373 A | 3/2008 |
| JP | 2010-043551 A | 2/2010 |
| KR | 10-2005-0003474 A | 1/2005 |
| KR | 10-2008-0020514 A | 3/2008 |
| KR | 10-2009-0028757 A | 3/2009 |

* cited by examiner

Primary Examiner — Erick Solis
(74) Attorney, Agent, or Firm — Morgan, Lewis & Bockius LLP

(57) ABSTRACT

An apparatus for controlling a motor determines whether or not to control the motor in order to control the variable valve lift device by using a measurement value of a valve lift and a target value of the valve lift, compares a predetermined base voltage range with a battery voltage in order to control the motor, determines a voltage factor corresponding to the battery voltage when the battery voltage is included in the base voltage range; and determines a driving signal value for the motor by applying the voltage factor to a predetermined base signal value.

7 Claims, 2 Drawing Sheets

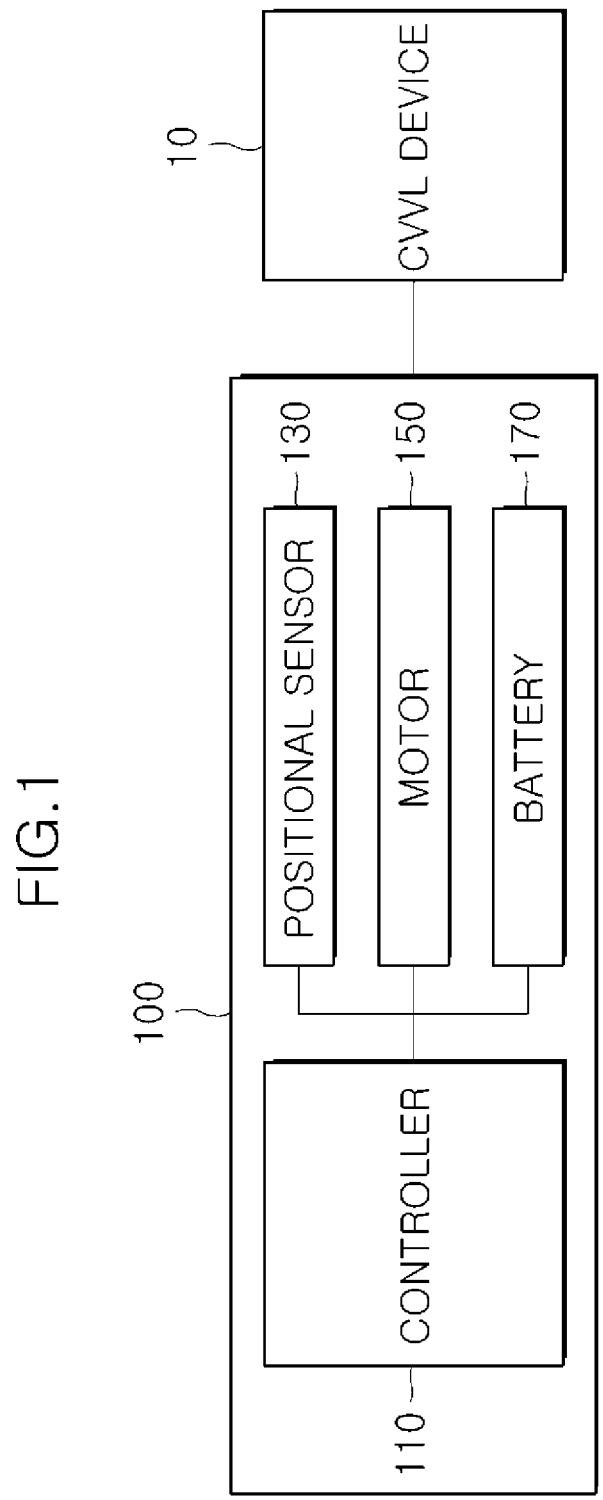

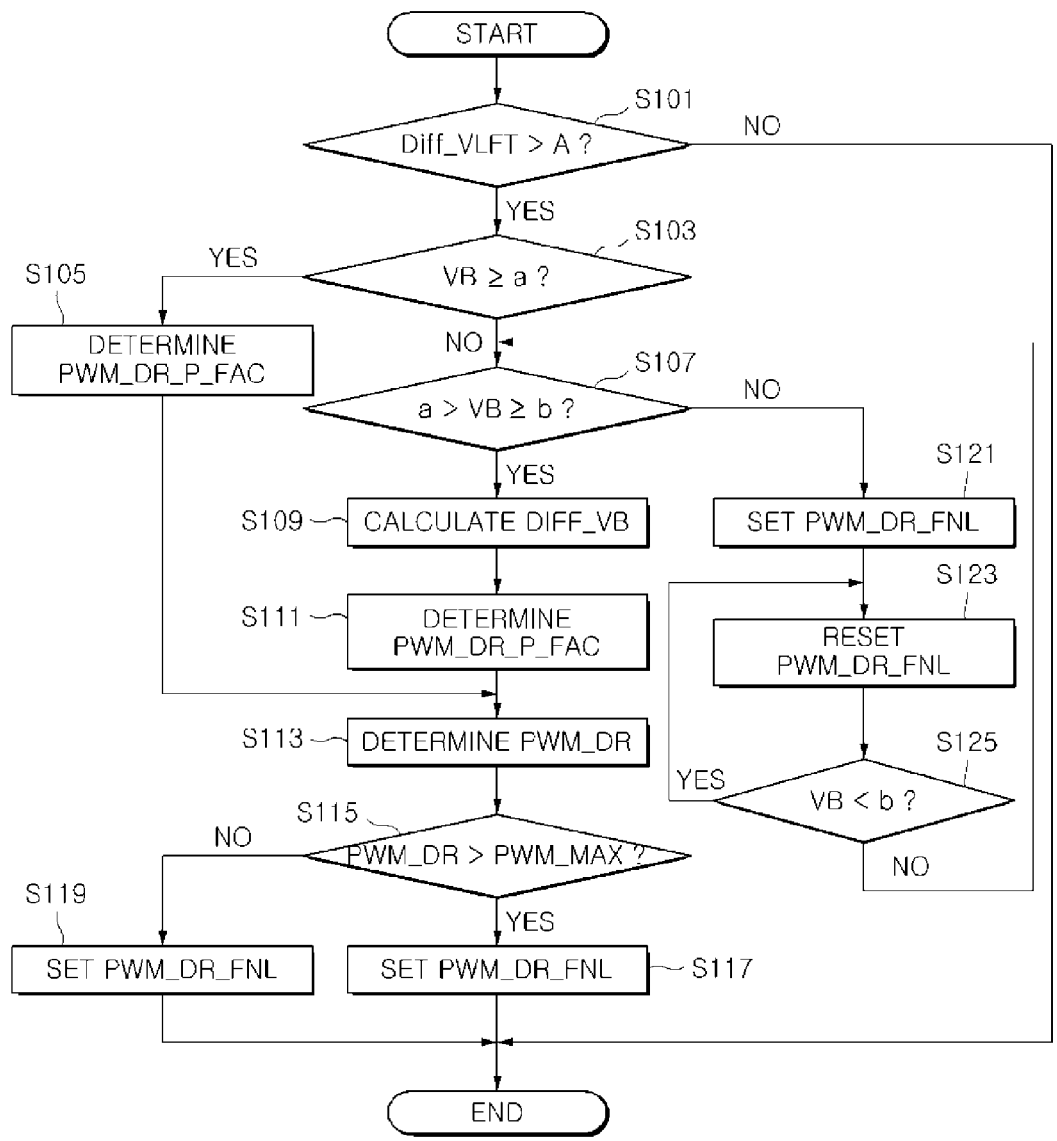

APPARATUS AND METHOD FOR CONTROLLING MOTOR

CROSS-REFERENCE TO RELATED APPLICATIONS

The present application claims priority to Korean Patent Application Number 10-2010-0124220 filed Dec. 7, 2010, the entire contents of which application is incorporated herein for all purposes by this reference.

BACKGROUND OF INVENTION

1. Field of Invention

The present invention relates to an apparatus and a method for controlling a motor. More particularly, the present invention relates to an apparatus and a method for controlling a motor driving a continuously variable valve lift device.

2. Description of Related Art

A continuously variable valve lift (hereinafter, referred to as 'CVVL') system varies an opening/closing level of a valve by varying a press level of a cam through rotation of an eccentric control shaft. In this case, a valve lift representing the opening/closing level of the valve is determined according to an angle value of the control shaft and the angle value of the control shaft is varied by a motor.

The CVVL system varies the angle value of the control shaft within a predetermined operation range by controlling the motor according to a difference between a present value and a target value of the valve lift so as to control the valve lift. In this case, in the CVVL system, since the valve lift determines an air volume, i.e., a driving force of an engine, control performance of the valve lift is a key element to determine control and reaction performance of the engine.

In this case, since controlling the CVVL device through the motor causes the motor to consume high current, it requires an optimal motor control condition.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an apparatus and a method for controlling a motor for performing control of an air volume of a CVVL system and control of a valve lift defining engine performance according to a condition of a vehicle.

Various aspects of the present invention provide for a method for controlling a motor in link with a variable valve lift device, the method including determining whether or not to control the motor in order to control the variable valve lift device by using a measurement value of a valve lift and a target value of the valve lift, comparing a predetermined base voltage range with a battery voltage in order to control the motor, determining a voltage factor corresponding to the battery voltage when the battery voltage is included in the base voltage range, and determining a driving signal value for the motor by applying the voltage factor to a predetermined base signal value.

Other aspects of the present invention provide for an apparatus for controlling a motor, which controls a variable valve lift, the apparatus including a motor, a positional sensor, a battery, and a controller. The motor controls a valve lift in link with the variable valve lift. The positional sensor measures the valve lift. The battery supplies power to the motor. The controller determines whether or not to control the motor according to a measurement value of the valve lift measured through the positional sensor, determines a driving signal value by using a voltage of the battery in order to control the motor, and controls the motor according to the driving signal value.

According to various aspects of the present invention, it is possible to maximize a CVVL control effect by preventing the performance of a motor from being deteriorated due to a battery voltage, prevent a voltage drop of the battery and performance deterioration of the battery by reducing a battery load according to motor control, and increase a travelling distance in a problematic situation by removing a load of the motor when the battery is defective.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a diagram showing a configuration of an exemplary apparatus for controlling a motor according to the present invention.

FIG. 2 is a diagram showing an exemplary method for controlling a motor according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1 showing a configuration of the apparatus for controlling a motor according to various embodiments of the present invention, a motor controlling apparatus 100 according to various embodiments of the present invention includes a positional sensor 130, a motor 150, and a battery 170. Motor controlling apparatus 100 controls a valve lift of a continuously variable valve lift (hereinafter, referred to as 'CVVL') device 10 through motor 150.

A controller 110 controls motor 150 according to a pulse width modulation (hereinafter, referred to as 'PWM') scheme.

Positional sensor 130 measures the valve lift of CVVL device 10.

Motor 150 controls the valve lift in link with CVVL device 10.

Battery 170 supplies power of motor controlling apparatus 100.

Next, a method in which the motor controlling apparatus controls a motor according to various embodiments of the present invention will be described with reference to FIG. 2.

Referring to FIG. 2 showing the method for controlling a motor according to various embodiments of the present invention, first, controller 110 determines whether a difference value of the valve lift Diff_VLFT corresponding to a difference value between a measurement value of the valve lift and a target value of the valve lift is larger than a predetermined threshold value A (S101).

According to a determination result of step S 101, when difference value of the valve lift Diff_VLFT is larger than threshold value A, controller 110 determines whether a voltage VB of battery 170 is equal to or larger than a first predetermined base voltage a (S103).

According to a determination result of step S103, when voltage VB of battery 170 is equal to or larger than predetermined base voltage a, controller 110 determines a PWM factor PWM_DR_P_FAC for acquiring a PWM driving signal value (S105). Herein, controller 110 may determine PWM factor PWM_DR_P_FAC as "0".

According to the determination result of step S103, when voltage VB of battery 170 is not equal to or larger than predetermined base voltage a, controller 110 determines whether voltage VB of battery 170 is included in a predetermined base voltage range (S107). Herein, the base voltage range is less than first base voltage a and equal to or larger than a second base voltage b.

According to a determination result of step S107, when voltage VB of battery 170 is included in the base voltage range, controller 110 calculates a voltage difference value Diff_VB corresponding to a difference between voltage VB of battery 170 and a predetermined voltage threshold value (S109).

Next, controller 110 determines PWM factor PWM_DR_P_FAC for acquiring the PWM driving signal value according to voltage difference value Diff_VB (S111). Herein, controller 110 may determine PWM factor PWM_DR_P_FAC by using a PWM factor table that is previously stored. In this case, the PWM factor table may follow Table 1.

TABLE 1

|  | Diff_VB | | |
| --- | --- | --- | --- |
|  | −5 V | ... | −1 V | 0 V |
| PWM_DR_P_FAC | 0.5 | ... | 0.1 | 0 |

Thereafter, controller 110 determines a PWM driving signal value PWM_DR by applying PWM factor PWM_DR_P_FAC to a PWM base signal value PWM_BAS corresponding to valve lift difference value Diff_VLFT (S113). Herein, controller 110 may calculate PWM driving signal value PWM_DR according to Equation 1.

PWM_DR=PWM_BAS*(1+PWM_DR_P_FAC)   [Equation 1]

Next, controller 110 determines whether PWM driving signal value PWM_DR is larger than a predetermined PWM maximum signal value PWM_MAX (S115).

According to a determination result of step S115, when PWM driving signal value PWM_DR is larger than PWM maximum signal value PWM_MAX, controller 110 sets a PWM final signal value PWM_DR_FNL as PWM maximum signal value PWM_MAX (S117). Herein, controller 110 controls motor 150 according to PWM final signal value PWM_DR_FNL, i.e., PWM maximum signal value PWM_MAX.

According to the determination result of step S115, when PWM driving signal value PWM_DR is not larger than PWM maximum signal value PWM_MAX, controller 110 sets a PWM final signal value PWM_DR_FNL as PWM driving signal value PWM_DR (S119). Herein, controller 110 controls motor 150 according to PWM final signal value PWM_DR_FNL, i.e., PWM driving signal value PWM_DR.

According to the determination result of step S107, when voltage VB of battery 170 is not included in the base voltage range, controller 110 sets PWM final signal value PWM_DR_FNL as a PWM voltage control signal value ID_PWM_VB_LIMP in order to perform only the most basic engine driving almost without the driving of motor 150 which is a high-current consuming component (S121). Herein, motor 150 moves the valve lift to the highest position according to PWM voltage control signal value ID_PWM_VB_LIMP.

Thereafter, controller 110 resets PWM final signal value PWM_DR_FNL as a PWM minimum signal value PWM_HOLD_LIMP in order to prevent reverse rotation or fluctuation of motor 150 (S123). Herein, motor 150 stops driving according to PWM minimum signal value PWM_HOLD_LIMP.

Next, controller 110 determines whether voltage VB of battery 170 is smaller than second base voltage b (S125).

According to a determination result of step S125, when voltage VB of battery 170 is smaller than second base voltage b, controller 110 performs step S123 again.

According to the determination result of step S125, when voltage VB of battery 170 is not smaller than second base voltage b, controller 110 performs step S107 again.

According to the determination result of step S101, when valve lift difference value Diff_VLFT is not larger than threshold value A, controller 110 ends the motor controlling method.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a motor operably connected with a variable valve lift device, the method comprising:
    determining whether or not to control the motor to control the variable valve lift device by using a measurement value of a valve lift and a target value of the valve lift;
    comparing a predetermined base voltage range with a battery voltage to control the motor;
    determining a voltage factor corresponding to the battery voltage when the battery voltage is included in the base voltage range;
    determining a driving signal value for the motor by applying the voltage factor to a predetermined base signal value; and controlling the motor according to a voltage control signal value to move the valve lift to a highest position when the battery voltage is smaller than a minimum value of the base voltage range.

2. The method as defined in claim 1, wherein the determining of the voltage factor includes:
   calculating a voltage difference value corresponding to a difference between the battery voltage and a predetermined voltage threshold value; and
   determining the voltage factor corresponding to the voltage difference value.

3. The method as defined in claim 1, wherein in the determining whether or not to control the motor, whether or not to control the motor is determined according to a valve lift difference value corresponding to a difference between the measurement value of the valve lift and the target value of the valve lift.

4. The method as defined in claim 3, wherein in the determining of the driving signal value, the driving signal value is determined by using the base signal value corresponding to the valve lift difference value.

5. The method as defined in claim 1, further comprising determining the base signal value as the driving signal value when the battery voltage is larger than a maximum value of the base voltage range.

6. The method as defined in claim 5, further comprising:
   controlling the motor according to a predetermined maximum signal value when the driving signal value is larger than the maximum signal value; and controlling the motor according to the driving signal value when the driving signal value is not larger than the maximum signal value.

7. The method as defined in claim 1, further comprising controlling the motor according to a minimum signal value to stop the driving of the motor after the controlling of the motor according to the voltage control signal value.

* * * * *